United States Patent
Li et al.

(10) Patent No.: US 8,202,125 B2
(45) Date of Patent: Jun. 19, 2012

(54) CARD CONNECTOR HAVING AN IMPROVED SPRING ARM

(75) Inventors: Li Li, Kunshan (CN); Jian-Fei Yu, Kunshan (CN); Ke-Hua Ye, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 34 days.

(21) Appl. No.: 12/943,036

(22) Filed: Nov. 10, 2010

(65) Prior Publication Data

US 2011/0111635 A1    May 12, 2011

(30) Foreign Application Priority Data

Nov. 10, 2009  (CN) .......................... 2009 2 0314487

(51) Int. Cl.
    *H01R 24/00*    (2011.01)
(52) U.S. Cl. ....................... 439/630; 439/946
(58) Field of Classification Search .................. 439/630, 439/633, 946
    See application file for complete search history.

(56) References Cited

U.S. PATENT DOCUMENTS

| | | | |
|---|---|---|---|
| 7,448,912 B1 * | 11/2008 | Shiue et al. | 439/630 |
| 7,833,064 B1 * | 11/2010 | Lai | 439/630 |
| 7,874,857 B2 * | 1/2011 | Takei et al. | 439/218 |
| 2006/0025019 A1 | 2/2006 | Zhu et al. | |
| 2007/0218770 A1 | 9/2007 | Kikuchi et al. | |

* cited by examiner

*Primary Examiner* — Khiem Nguyen
(74) *Attorney, Agent, or Firm* — Wei Te Chung; Andrew C. Cheng; Ming Chieh Chang

(57) ABSTRACT

A card connector includes a first inserting slot (151) for insertion of a first memory card (200) with first terminals (3) extending thereinto; a second inserting slot (152) for insertion of a second memory card (300) with second terminals (4) extending thereinto; and a partition wall (14) located between the first and second inserting slots for separating the first and second inserting slots. The partition wall has one spring arm (142) integrally extending therefrom and located between the first and second inserting slots, when one of the first and second memory cards (200, 300) is inserted into the corresponding one of the first and second inserting slots (151, 152), the spring arm (142) protrudes into the other one of the first and second inserting slots (151, 152) so as to prevent the other one of the first and second memory cards from being inserted into the other one of the first and second inserting slots.

7 Claims, 5 Drawing Sheets

CARD CONNECTOR HAVING AN IMPROVED SPRING ARM

BACKGROUND OF THE INVENTION

1. Field of the Invention

The present invention relates to a card connector, and more particularly to a card connector having an improved spring arm permitting one memory card only to be inserted at a time.

2. Description of Related Art

In recent years, with the widespread use of digital cameras and the like, memory cards having a large storage capacity and a compact shape have been used. A wide variety of cards have been used depending upon characteristics and the like of appliances with which the memory cards are used, and therefore card connectors adapted to accommodate cards of a plurality of kinds will be favorable. With such card connectors adapted to receive the cards of different kinds, however, it will be required to prevent a plurality of cards from being inserted into a card connector at a time.

The card connector usually comprises an insulating housing defining adjacent card cavities; a plurality of card contacts retained in the housing to expose to the corresponding card cavities; and at least one separated controlling member assembled to the housing and located between the two card cavities, and comprising upper and lower protrusions deflected between the two card cavities and protruding into the one card cavity when a card has been inserted into the other card cavity, and a resilient portion for urging the upper and lower protrusions to resume their original positions when the card has been withdrawn from the other cavity. However, the separated controlling member must be made of separately and will increase the manufacturing costs.

Hence, an improved card connector is desired to overcome the above problems.

BRIEF SUMMARY OF THE INVENTION

According to one aspect of the present invention, a card connector comprises: a first inserting slot for insertion of a first memory card with a plurality of first terminals extending thereinto for mating with the first memory card; a second inserting slot for insertion of a second memory card with a plurality of second terminals extending thereinto for mating with the second memory card; and a partition wall located between the first and second inserting slots for separating the first inserting slot and the second inserting slot; wherein the partition wall has at least one spring arm integrally extending therefrom and located between the first and second inserting slots, when one of the first and second memory cards is inserted into the corresponding one of the first and second inserting slots, the spring arm protrudes into the other one of the first and second inserting slots so as to prevent the other one of the first and second memory cards from being inserted into the other one of the first and second inserting slots.

According to another aspect of the present invention, a card connector for insertion of at least two memory cards comprises: an insulative housing having a pair of inserting slots arranged in vertically overlapping relationship for inserting said memory cards and a partition wall arranged between said inserting slots so as to separate said inserting slots; a plurality of terminals protruding into the inserting slots for mating with the memory cards; and a cantilevered spring arm integrally extending from the partition wall and located between said inserting slots, when one memory card being inserted into one inserting slot, the spring arm protruding into the other inserting slot so as to prevent the other memory card from being inserted into the other inserting slot.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
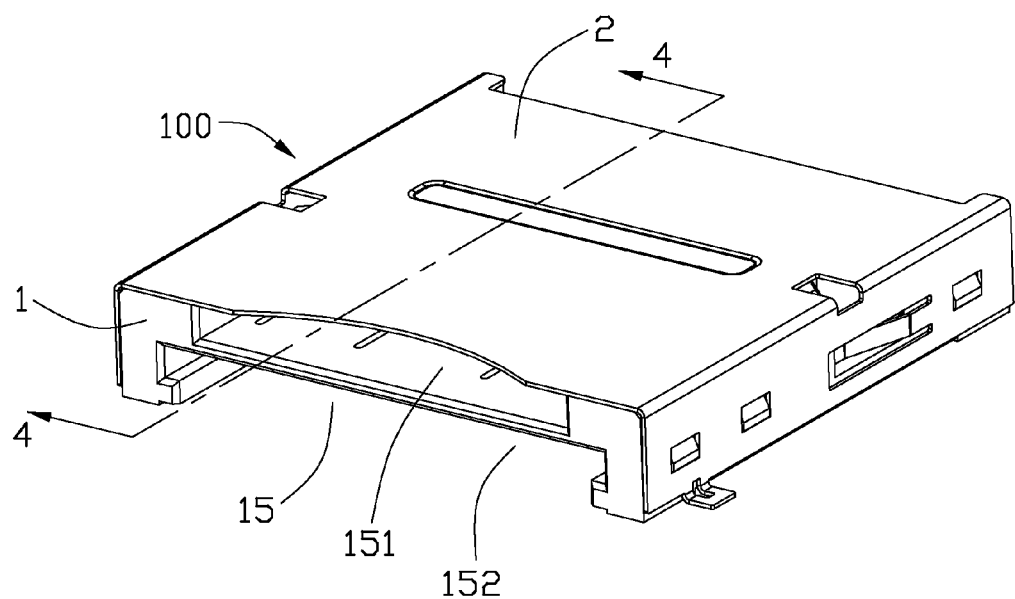
FIG. 1 is a perspective view of a card connector according to the present invention.
Figure 2:
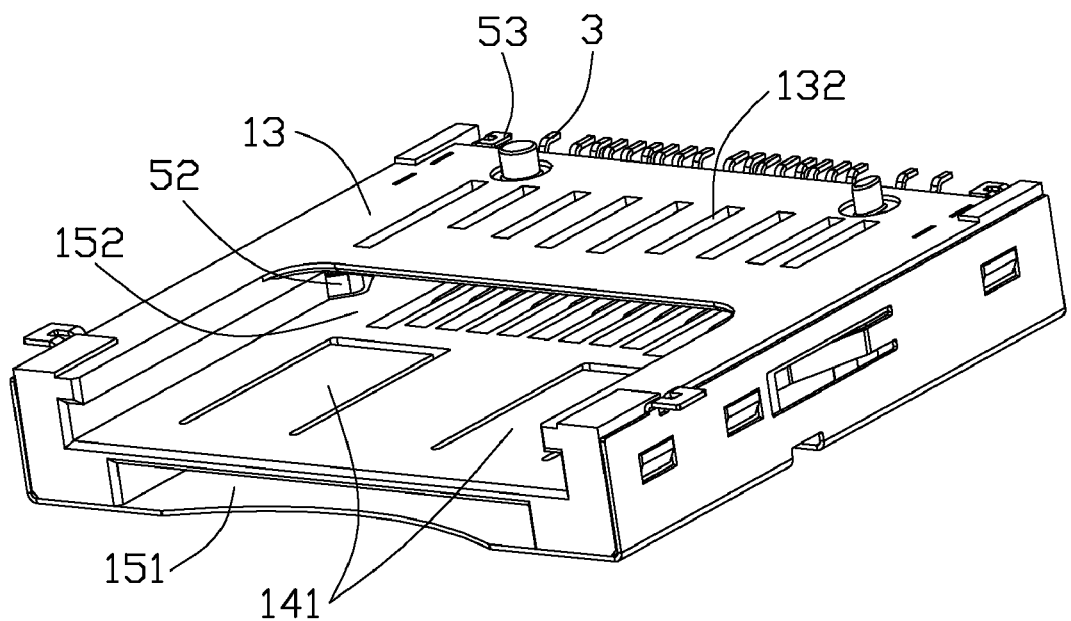
FIG. 2 is similar to the FIG. 1, but viewed from another aspect.
Figure 3:
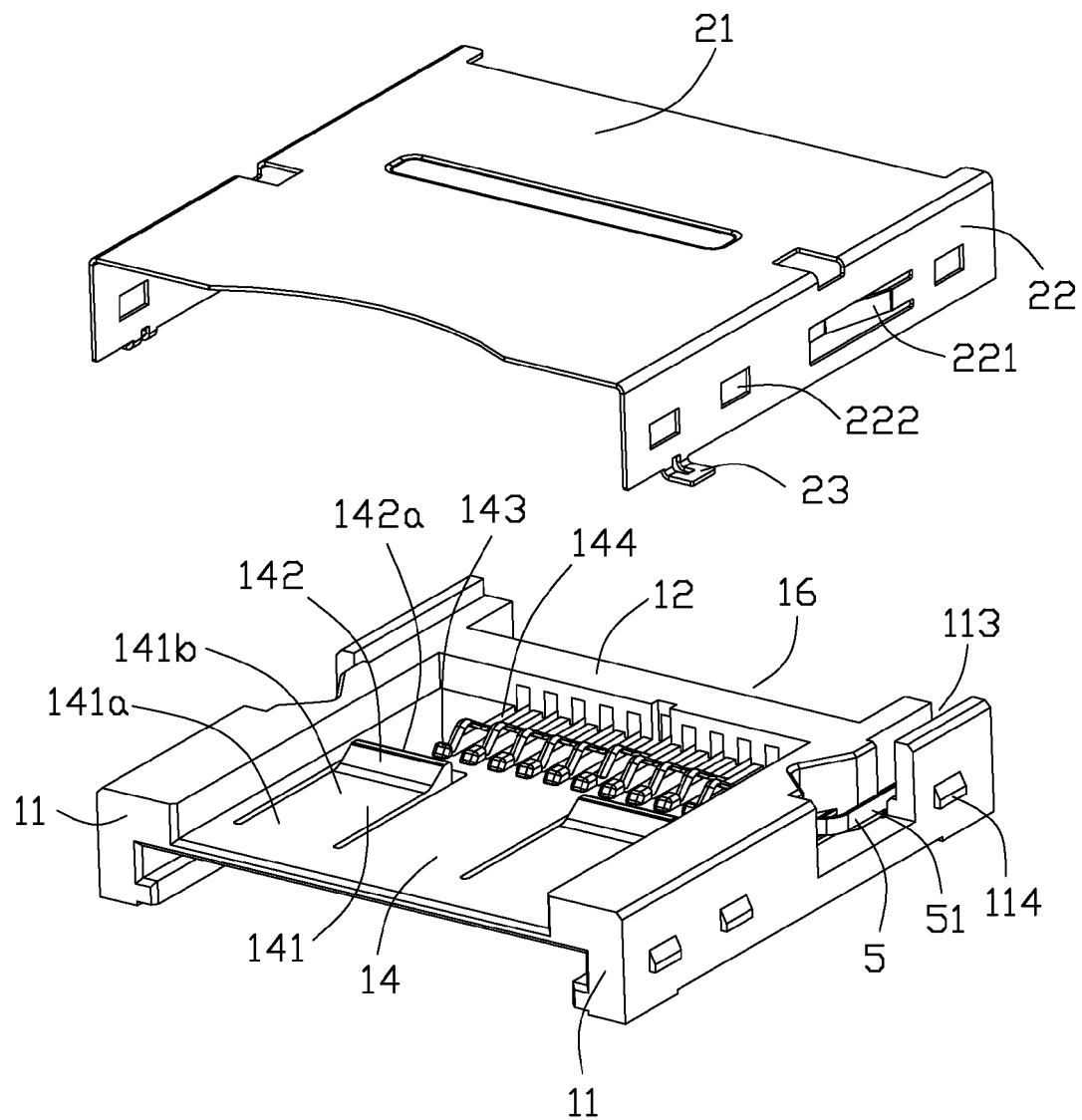
FIG. 3 is a partially exploded view of the card connector shown in FIG. 1.
Figure 4:
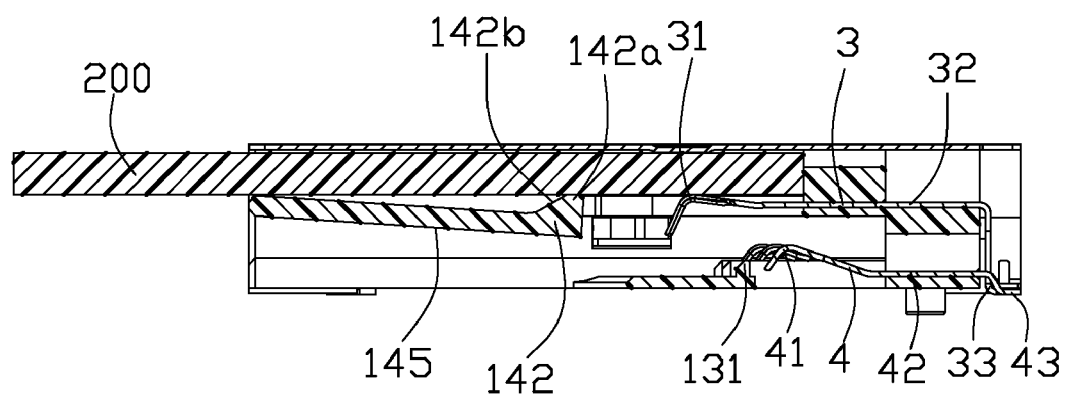
FIG. 4 is a crossed-sectional view showing a first memory card inserted into the card connector.
Figure 5:
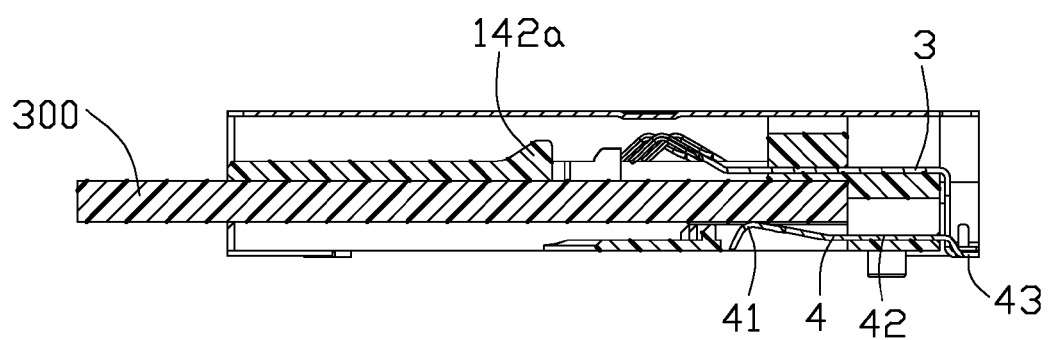
FIG. 5 is a crossed-sectional view showing a second memory card inserted into the card connector.

Referring to FIGS. 1-5, a card connector 100 for insertion of at least two types of memory cards according to the present invention, comprises an insulative housing 1, a plurality of first and second terminals 3, 4 retained in the insulative housing 1, a pair of metal locking members 5 coupled to the insulative housing 1, and a metal shell 2 covering the insulative housing 1.

Referring to FIGS. 1-5, the insulative housing 1 is molded of dielectric material such as plastic or the like and includes a bottom wall 13, a pair of side walls 11 extending upwardly from two lateral sides of the bottom wall 13, a back wall 12 connecting the side walls 11, a receiving space 15 formed among the bottom wall 13 and the side walls 11, and a partition wall 14 partitioning the receiving space 15 into an upper first inserting slot 151 and a lower second inserting slot 152. The first and second inserting slots 151, 152 are arranged in a vertical overlapping relationship in a condition that the first inserting slot 151 has a width narrower than that of the second inserting slot 152. The first inserting slot 151 has an opening at front thereof for insertion of a first memory card 200 such as MS card. The second inserting slot 152 has an opening at front thereof for insertion of a second memory card 300 such as SD card. Each side wall 11 has a groove 113 recessed downwardly from an upper surface thereof and communicating with the second inserting slot 152, and a plurality of protrusions 114 formed at an outer surface thereof. The partition wall 14 has a pair of cantilevered spring arms 141 integrally extending in a front-to-back direction therefrom. Each spring arm 141 has a fixed end 141*a* connecting to the partition wall 14 and a free end 141*b* opposite to the fixed end 141*a*. The spring arm 141 comprises a stopper 142 formed at the free end 141*b* of and defining a projection 142*a* projecting upwardly into the first inserting slots 151. The spring arm 141 defines a bottom surface 145 wholly coplanar with a bottom surface defined by the partition wall 14. The projection 142*a* of the stopper 142 defines an inclined surface 142*b* extending obliquely relative to the bottom surface 145. The partition wall 14 has a set of first blocks 143 formed thereon and located behind the spring arms 141, and a set of first passageways 144 corresponding to the first blocks 143. The bottom wall 13 has a set of second blocks 131 and a set of second passageways 132 corresponding to the second blocks 131.

The first and second terminals 3, 4 are assembled to the insulative housing 1 from a rear side of the back wall 12. The first terminals 3 have first contacting portions 31 received in the first passageways 144 and protruding into the first inserting slot 151 for mating with the first memory card 200, first mounting portions 33 extending out of the back wall 12 for being mounted onto a printed circuit board (not shown), and first retaining portions 32 retained in the back wall 12. The second terminals 4 have second contacting portions 41 received in the second passageways 132 and protruding into the second inserting slot 152 for mating with the second memory card 300, second mounting portions 43 extending out of the back wall 12 for being mounted onto the printed circuit board, and second retaining portions 42 retained in the back wall 12. The side walls 11 extend backwardly beyond the back wall 12 so as to form a cavity 16 among the side walls 11 and the back wall 12. The first and second mounting portions 33, 43 are arranged in one row along a transverse direction perpendicular to the front-to-back direction and received in the cavity 16. The first and second blocks 143, 131 are located at front of the first and second contacting portions 31, 41 respectively so as to prevent the first and second contacting portions 31, 41 from forwardly over deformation.

Each locking member 5 has a securing portion 51 retained in the groove 113, a latching portion 52 protruding into the second inserting slot 152 for latching with the second memory card 300, and a tail portion 53 extending out of the side wall 11 for being mounted onto the printed circuit board.

The shell 2 is stamped from one piece of metal sheet and comprises a top plate 21, a pair of side plates 22 extending downwardly from two lateral sides of the top plate 21 and being retained in the side walls 11, and a pair of mounting legs 23 extending from the side plates 22 for being mounted onto the printed circuit board. Each side plate 22 has a set of apertures 222 latched on the protrusions 114, and a clasping arm 221 protruding inwardly therefrom and resisting the locking member 5.

Referring to FIGS. 1-5, under a condition that there is no memory card inserted, the projection 142*a* of the spring arm 141 upwardly projects into the first inserting slot 151, the bottom surface 145 of the spring arm 141 is wholly coplanar with the bottom surface of the partition wall 14, and the stopper 142 dose not protruded into the second inserting slot 152. When the first memory card 200 is inserted into the first inserting slot 151, the first memory card 200 abuts against the inclined surface 142*b* of the projection 142*a* and pushes the stopper 142 downwardly into the second inserting slot 152 so that the first memory card 200 goes into its final position of the first inserting slot 151 to mate with the first terminals 3, then if the second memory card 300 is being inserted into the second inserting slot 152, the second memory card 300 will collide with the stopper 142 which has protruded into the second inserting slot 152 and enforced in its position by the first memory card 200 inserted in the first inserting slot 151, therefore, the stopper 142 provides a reliable impediment to the second memory card 300 so that the second memory card 300 can be prevented from being inserted into the second inserting slot 152. When the second memory card 300 is inserted into the second inserting slot 152, because the bottom surface 145 of the spring arm 141 is wholly coplanar with the bottom surface of the partition wall 14, the stopper 142 will keep still with the second memory card 300 going into its final position of the second inserting slot 152 to mate with the second terminals 4, and if the first memory card 200 is inserted into the first inserting slot 151, the first memory card 200 will collide with the projection 142*a* which protrudes into the first inserting slot 151 and is enforced in its original position by the second memory card 300 inserted in the second inserting slot 152, therefore, the stopper 142 provides a reliable impediment to the first memory card 300 so that the first memory card 300 can be prevented from being inserted into the first inserting slot 151.

In this invention, the spring arm 141 is integrally formed with the insulative housing 1 and is made of dielectric materials same as the insulative housing 1. In another embodiment of this invention, the stopper 142 could include a pair of projections 142*a* protruding into both the first and the second inserting slots 151, 152, in this way, when a memory card is inserted into any one of the first and second inserting slots 151, 152, the stopper 142 will be pushed greatly toward into the other one of the first and second inserting slots 151, 152 by the memory card, it is apparent that another memory card can be prevented from being inserted into the other one of the first and second inserting slots 151, 152.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A card connector comprising: a first inserting slot for insertion of a first memory card with a plurality of first terminals extending thereinto for mating with the first memory card; a second inserting slot for insertion of a second memory card with a plurality of second terminals extending thereinto for mating with the second memory card; and a partition wall located between the first and second inserting slots for separating the first inserting slot and the second inserting slot; wherein the partition wall has at least one spring arm integrally extending therefrom and located between the first and second inserting slots, when one of the first and second memory cards is inserted into the corresponding one of the first and second inserting slots, the spring arm protrudes into the other one of the first and second inserting slots so as to prevent the other one of the first and second memory cards from being inserted into the other one of the first and second inserting slot, wherein the spring arm extends in a cantilevered manner, the spring arm has a fixed end connecting to the partition wall and a stopper formed at a free end opposite to the fixed end for protruding into the first or second inserting slots, wherein when there is no memory card inserted into the card connector, the stopper protrudes into the first inserting slot and does not protrudes into the second inserting slot, wherein when the first memory card is inserted into the first inserting slot, the first memory card pushes the stopper protruding into the second inserting slot so as to prevent the second memory card from being inserted into the second inserting slot, when the second memory card is inserted into the second inserting slot, the stopper having protruded into the first inserting slot keeps still and is enforced in its original position by the second memory card so as to prevent the first memory card from being inserted into the first inserting slot, wherein the stopper has a projection protruding into the first inserting slot and defining an inclined surface extending obliquely relative to the partition wall.

2. The card connector according to claim 1, wherein the partition wall has a plurality of first passageways formed thereon and located behind the spring arm for receiving the first terminals.

3. The card connector according to claim 1, wherein the partition wall and the spring arm are made of plastic materials.

4. The card connector according to claim 1, wherein the second inserting slot has a width wider than that of the first inserting slot.

5. A card connector for insertion of at least two memory cards comprising: an insulative housing having a pair of inserting slots arranged in vertically overlapping relationship for inserting said memory cards and a partition wall arranged between said inserting slots so as to separate said inserting slots; a plurality of terminals protruding into the inserting slots for mating with the memory cards; and a cantilevered spring arm integrally extending from the partition wall and located between said inserting slots, when one memory card being inserted into one inserting slot, the spring arm protruding into the other inserting slot so as to prevent the other memory card from being inserted into the other inserting slot, wherein when there is no memory card inserted into the card connector, the spring arm defines a pair of opposed surfaces facing the corresponding inserting slots, one of the opposed surfaces has a projection protrudes therefrom into one inserting slot and beyond a first surface of the partition wall, the other one of the opposed surfaces is wholly coplanar with a second surface of the partition wall opposite to the first surface, wherein when one memory card is inserted into the one inserting slot, the memory card pushes the projection to drive a free end of the resilient member protruding into the other inserting slot so that the other memory card can be prevented from being inserted into the other inserting slot, when the other memory card is inserted into the other inserting slot, the projection which has protruded into the one inserting slot keeps still and is enforced in its original position by the other memory card so as to prevent the one memory card from being inserted into the one inserting slot.

6. The card connector according to claim 5, wherein the insulative housing has a bottom wall parallel to and located under the partition wall, each of the bottom wall and partition wall defines a plurality of passageways formed thereon for receiving the terminals.

7. An electrical card connector for insertion of first and second memory cards comprising: an insulative housing including a pair of side arms linked by a transverse bar located around a rear side to commonly define a card receiving cavity; a horizontal interposer plate unitarily formed with the housing to divide said card receiving cavity into upper and lower spaces; a first set of contacts disposed in the housing with first contacting sections extending into the upper space; and a second set of contacts disposed in the housing with second contacting sections extending into the lower space; wherein said interposer plate is unitarily equipped with a deflected spring arm with a protrusion moveable up and down between the upper space and the lower space, wherein said protrusion defines two opposite faces in a vertical direction wherein at least one obliquely extends into the corresponding one of the upper and lower spaces when said spring arm is in a relaxed manner, wherein the other extends flat and essentially being flush with a boundary of the corresponding space.

* * * * *